United States Patent
Park et al.

(10) Patent No.: US 12,496,591 B2
(45) Date of Patent: Dec. 16, 2025

(54) DUST COLLECTION FILTER AND DUST COLLECTION FILTER MANUFACTURING METHOD

(71) Applicant: LG ELECTRONICS INC., Seoul (KR)

(72) Inventors: Minjae Park, Seoul (KR); Okchun Hyun, Seoul (KR); Jungryun Lee, Seoul (KR); Seungjae Baeck, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 400 days.

(21) Appl. No.: 18/016,713

(22) PCT Filed: Jul. 26, 2021

(86) PCT No.: PCT/KR2021/009666
§ 371 (c)(1),
(2) Date: Jan. 18, 2023

(87) PCT Pub. No.: WO2022/019731
PCT Pub. Date: Jan. 27, 2022

(65) Prior Publication Data
US 2023/0278043 A1   Sep. 7, 2023

(30) Foreign Application Priority Data
Jul. 24, 2020   (KR) .................. 10-2020-0092071

(51) Int. Cl.
*B03C 3/45*   (2006.01)
*B01D 46/00*   (2022.01)
(Continued)

(52) U.S. Cl.
CPC ............ *B03C 3/45* (2013.01); *B01D 46/0032* (2013.01); *B03C 3/155* (2013.01); *B03C 3/60* (2013.01)

(58) Field of Classification Search
CPC .. B03C 3/155; B03C 3/45; B03C 3/60; B01D 46/0032; B01D 46/50
See application file for complete search history.

(56) References Cited

U.S. PATENT DOCUMENTS

| | | |
|---|---|---|
| 3,930,815 A | 1/1976 | Masuda |
| 4,750,921 A | 6/1988 | Sugita et al. |
| (Continued) | | |

FOREIGN PATENT DOCUMENTS

| | | |
|---|---|---|
| JP | 6290891 | 3/2018 |
| KR | 10-2015-0126483 | 11/2015 |
| WO | WO 85-00556 | 2/1985 |

OTHER PUBLICATIONS

International Search Report dated Nov. 24, 2021 issued in Application No. PCT/KR2021/009666.
(Continued)

*Primary Examiner* — Robert Clemente
(74) *Attorney, Agent, or Firm* — KED & ASSOCIATES

(57) ABSTRACT

The present invention relates to a dust collecting filter and a method for manufacturing a dust collecting filter. The dust collecting filter of the present invention may comprise: a filter medium collecting foreign substances in the air; a plurality of first conductive threads sewn to the filter medium and to which a high voltage is applied; and a plurality of second conductive threads sewed to the filter medium, disposed between the plurality of first conductive threads, and grounded.

8 Claims, 7 Drawing Sheets

(51) Int. Cl.
  *B03C 3/155*  (2006.01)
  *B03C 3/60*  (2006.01)

(56)  References Cited

U.S. PATENT DOCUMENTS

| | | |
|---|---|---|
| 7,691,186 B2 | 4/2010 | Wiser |
| 2007/0199451 A1 | 8/2007 | Wiser |
| 2023/0285984 A1* | 9/2023 | Baeck ........................ B03C 3/32 |

OTHER PUBLICATIONS

German Office Action dated Jan. 28, 2025 issued in Application No. 11 2021 003 939.3.

* cited by examiner

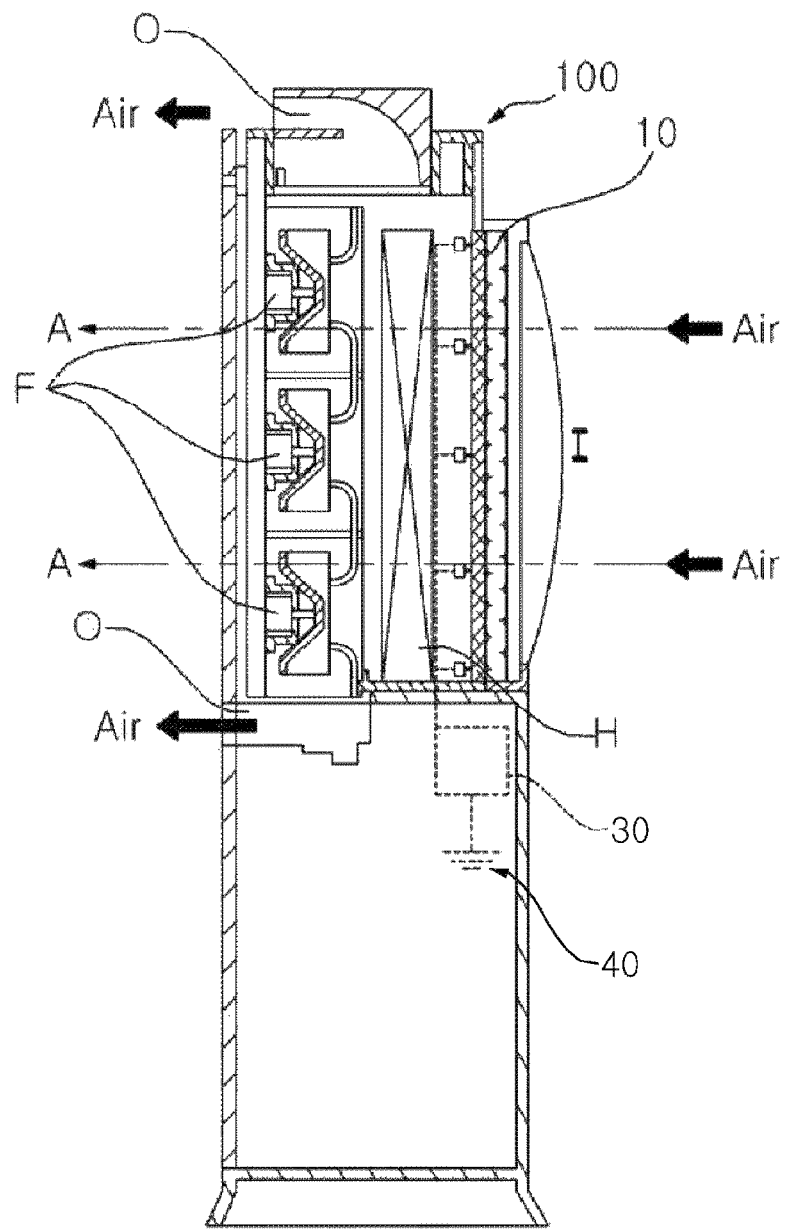
[FIG. 1]

[FIG. 2]
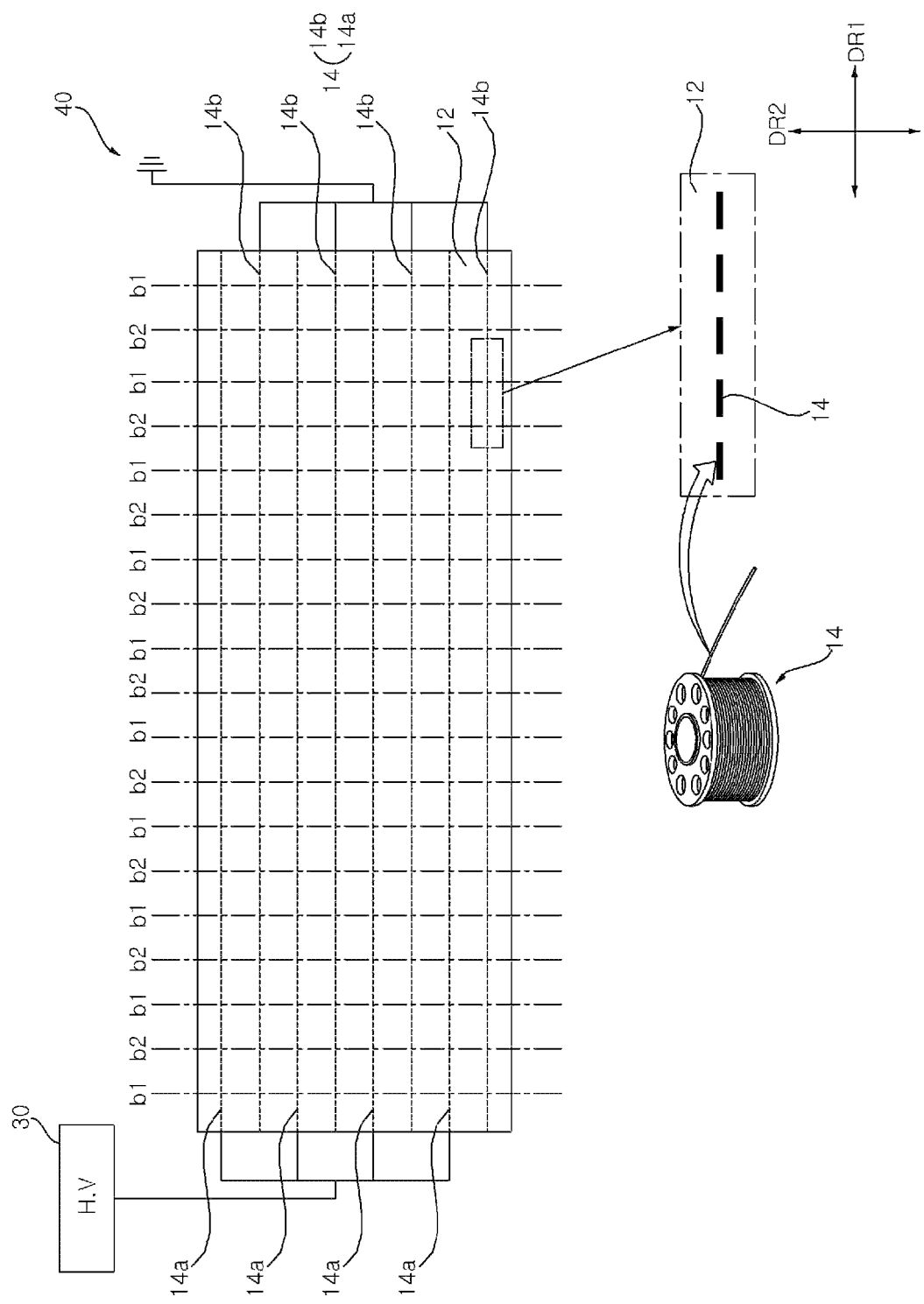

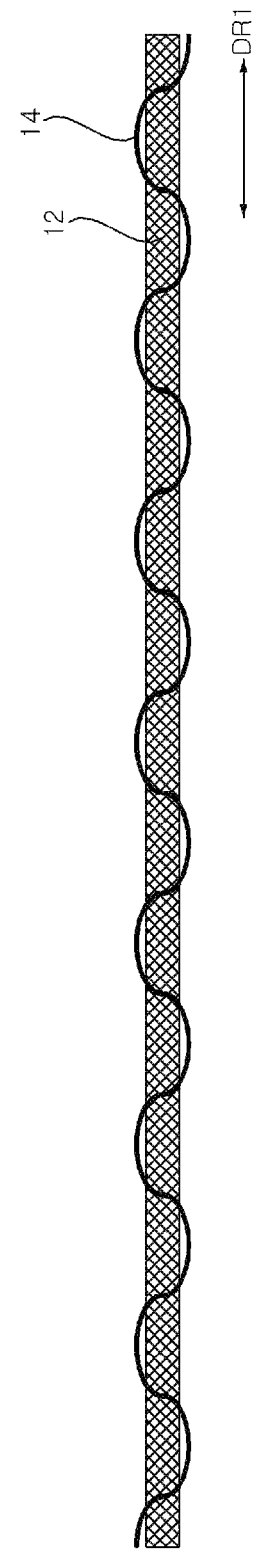

[FIG. 4]
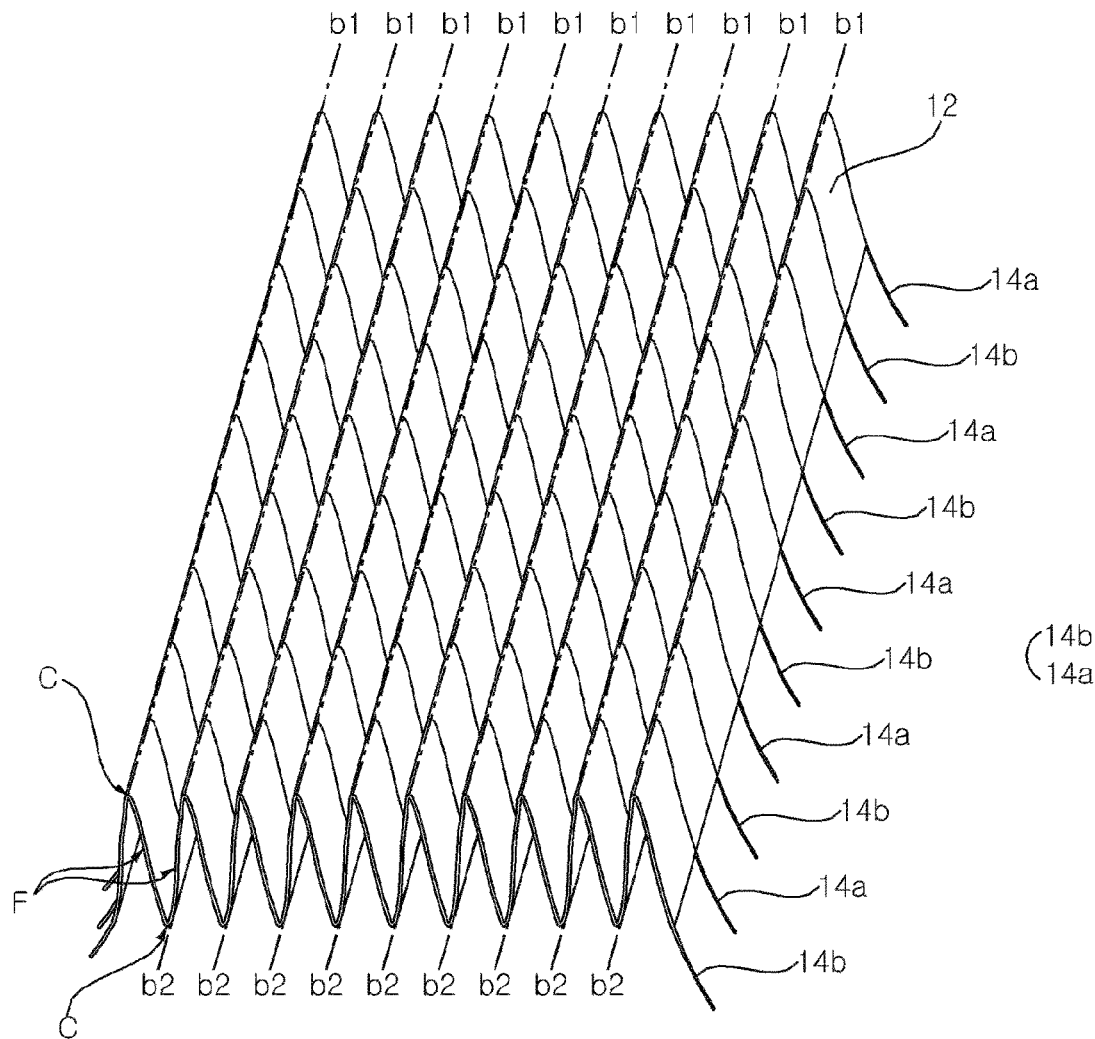
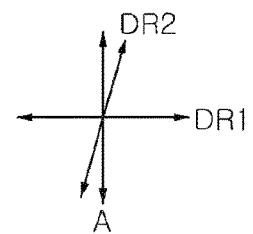

[FIG. 5]
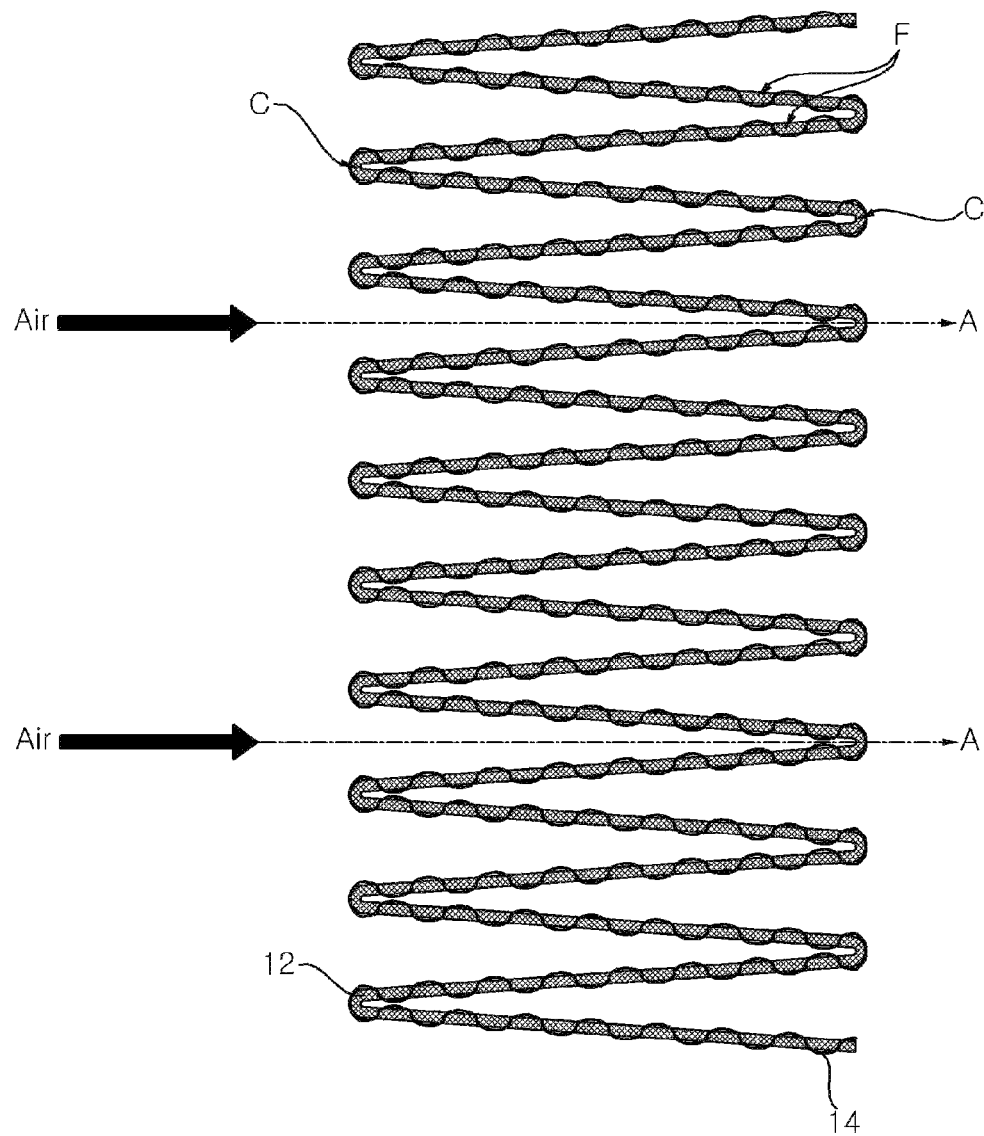

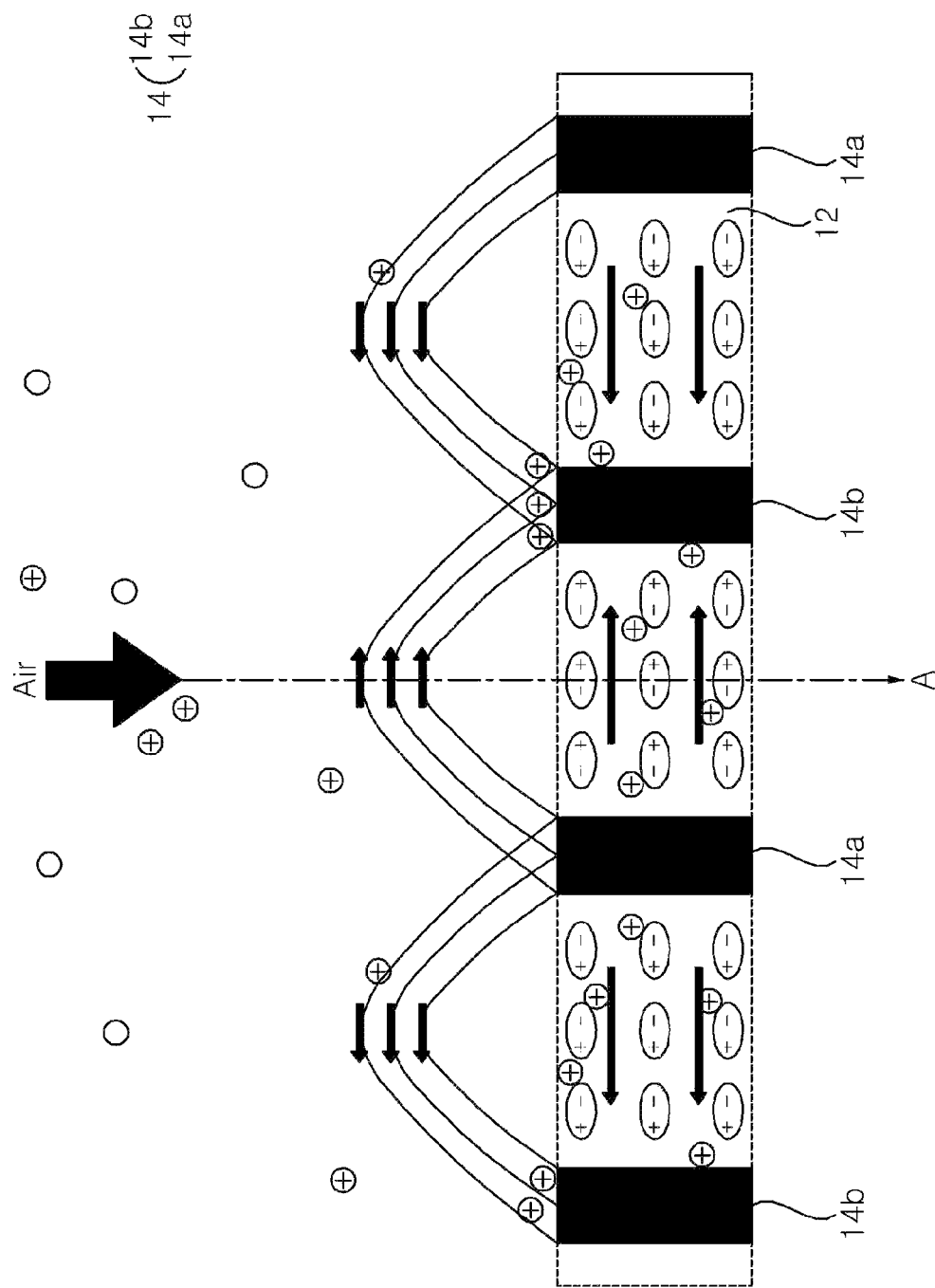

[FIG. 7]
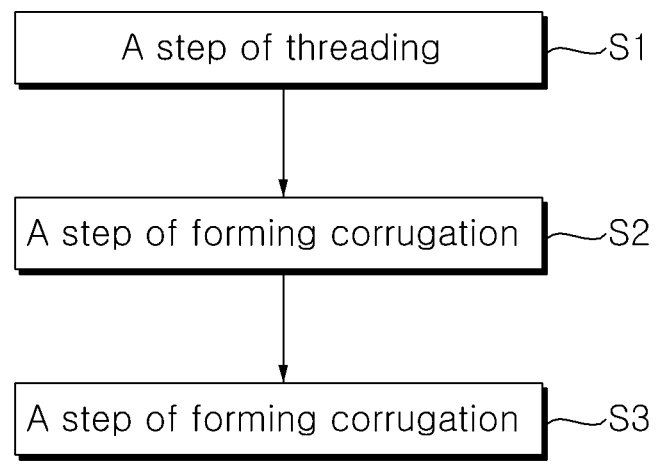

DUST COLLECTION FILTER AND DUST COLLECTION FILTER MANUFACTURING METHOD

CROSS-REFERENCE TO RELATED PATENT APPLICATIONS

This application is a U.S. National Stage Application under 35 U.S.C. § 371 of PCT Application No. PCT/KR2021/009666, filed Jul. 26, 2021, which claims priority to Korean Patent Application No. 10-2020-0092071, filed Jul. 24, 2020, whose entire disclosures are hereby incorporated by reference.

TECHNICAL FIELD

The present disclosure relates to a dust collecting filter and method for a manufacturing dust collecting filter. More specifically, the present disclosure relates to a dust collecting filter that induces electrostatic polarization using a conductive thread.

BACKGROUND ART

In general, a dust collecting filter is a device that is attached to an air conditioner such as an air purifier, a cooler or a heater, and collects foreign substances such as dust contained in the air.

In general, a dust collecting filter generates an electric field through a voltage electrode to which a high voltage is applied and a counter electrode (ground electrode) grounded, and after the electric field induces and polarizes the dipole moment in the foreign substances in the air, the foreign substances is collected through the electrostatic attraction of the electrode. Such a dust collecting filter may be used together with a filter medium to polarize fiber particles of the filter medium, thereby collecting foreign substances through polarization force between the polarized foreign substances and the fiber particles.

On the other hand, when the electrode is disposed on the filter medium or upstream or downstream of the filter medium, there is a problem in that the pressure loss increases because the electrode has a large area blocking the permeable area of the filter medium.

DISCLOSURE

Technical Problem

It is an object of the present disclosure to provide a dust collecting filter that collects foreign substances through an electric field and has almost no pressure loss due to an electrode.

It is another object of the present disclosure to provide a dust collecting filter that has a simple manufacturing process and is easy to mass-produce.

The objects of the present invention are not limited to the objects mentioned above, and other objects not mentioned will be clearly understood by those skilled in the art from the following description.

Technical Solution

In accordance with an aspect of the present disclosures for accomplishing the above and other objects, there may be provided a dust collecting filter comprising: a filter medium collecting foreign substances in the air; a plurality of first conductive threads sewn to the filter medium and to which a high voltage is applied; and a plurality of second conductive threads sewed to the filter medium, disposed between the plurality of first conductive threads, and grounded.

The first conductive thread and the second conductive thread may be disposed parallel to each other.

Each of the first conductive thread and the second conductive thread alternately may pass through one surface and the other surface of the filter medium and are threaded through the filter medium.

the filter medium may be bent into a corrugated shape.

Rach of the first conductive thread and the second conductive thread may be alternately disposed on one surface and the other surface of the filter medium along the corrugated shape of the filter medium.

The first conductive thread and the second conductive thread may be disposed in a direction parallel to a direction in which a plurality of corrugations of the filter medium are arranged.

On the other hand, in accordance with an aspect of the present disclosures for accomplishing the above and other objects, there may be provided a method for manufacturing a dust collecting filter comprising: a step of threading the plurality of first conductive threads and the plurality of second conductive threads to the filter medium so that the plurality of first conductive threads and the plurality of second conductive threads are alternately spaced apart from each other; and a step of forming an electrode by connecting a power source for applying a high voltage to the plurality of first conductive threads and connecting a ground to the plurality of second conductive threads.

In the step of threading, the first conductive thread and the second conductive thread may be disposed parallel to each other.

In the step of threading, the first conductive thread and the second conductive thread may be threaded through the filter medium through a sewing machine.

In the step of threading, the first conductive thread and the second conductive thread may be alternately passed through one surface and the other surface of the filter medium and threaded through the filter medium.

The method for manufacturing a dust collecting filter may further comprise a step of forming corrugation by bending the filter medium into a corrugated shape after the step of threading.

In the step of forming corrugation, the filter medium may be bent such that a direction in which a plurality of corrugations of the filter medium arranged is parallel to the longitudinal direction of the first conductive thread and the second conductive thread.

Details of other embodiments are included in the detailed description and drawings.

Advantageous Effects

According to the dust collecting filter of the present invention, one or more of the following effects are provided.

First, there is an advantage in that there is almost no pressure loss of the dust collecting filter due to the electrode by collecting foreign substances through electrostatic polarization or discharge through a conductive thread.

Second, since the dust collecting filter is manufactured by threading a conductive thread through the filter medium, the manufacturing process is simple, and the manufacturing cost is minimized, so that it is easy to mass-produce.

The effects of the present invention are not limited to the effects mentioned above, and other effects not mentioned will be clearly understood by those skilled in the art from the description of the claims.

DESCRIPTION OF DRAWINGS

FIG. 1 is a cross-sectional view showing an air conditioner in which a dust collecting filter is installed according to an embodiment of the present invention.

FIG. 2 is a drawing showing the main configuration of a dust collecting filter according to an embodiment of the present invention.

FIG. 3 is a cross-sectional view showing a cross section of a dust collecting filter according to an embodiment of the present invention.

FIG. 4 is a perspective view showing a dust collecting filter according to another embodiment of the present invention. Specifically, FIG. 4 shows that the dust collecting filter of FIGS. 2 and 3 is bent into a corrugated shape.

FIG. 5 is a cross-sectional view showing a cross section of the dust collecting filter of FIG. 4.

FIG. 6 is a schematic drawing of a phenomenon in which an electric field is activated in a dust collecting filter according to the present invention.

FIG. 7 is a flowchart of a method for manufacturing a dust collecting filter according to an embodiment of the present invention.

BEST MODE

Advantages and features of the present invention, and methods of achieving them, will become clear with reference to the embodiments described below in detail in conjunction with the accompanying drawings. However, the present invention is not limited to the embodiments disclosed below and may be implemented in various different forms, only the present embodiments make the disclosure of the present invention complete, and it is provided to completely inform the skilled in the art the scope of the present invention, and the present invention is only defined by the scope of the claims. same reference numbers designate same elements throughout the specification.

The spatially relative terms "below", "beneath", "lower", "above", "upper", etc. can be used to easily describe components and their correlations with other components. Spatially relative terms should be understood as encompassing different directions of elements in use or operation in addition to the directions shown in the drawings. For example, if a component shown in the drawing is inverted, a component described as "below" or "beneath" another component can be placed "above" the other component. Thus, the exemplary term "below" may include directions of both below and above. Elements may be positioned facing other directions, and thus spatially relative terms may be interpreted according to orientation.

Terminology used herein is for describing the embodiments and is not intended to limit the present invention. In this specification, singular forms also include plural forms unless specifically stated otherwise in a phrase. As used herein, "comprises" and/or "comprising" do not exclude the presence or addition of one or more other components, steps and/or operations other than the stated components, steps and/or operations.

Unless otherwise defined, all terms (including technical and scientific terms) used in this specification may be used in a meaning commonly understood by those of ordinary skill in the art to which the present invention belongs. In addition, terms defined in commonly used dictionaries are not interpreted ideally or excessively unless explicitly specifically defined.

In the drawings, the thickness or size of each component is exaggerated, omitted, or schematically illustrated for convenience and clarity of explanation. Also, the size and area of each component do not entirely reflect the actual size or area.

Hereinafter, with reference to the accompanying drawings, a preferred embodiment of the present invention will be described.

Referring to FIG. 1, in an air conditioner 100 according to an embodiment of the present invention, a suction port I, a fan, and an outlet port O may be sequentially disposed along an air flow direction A. A dust collecting filter 10 and a heat exchanger H may be disposed between the suction port I and the discharge port O.

When the fan is operated, the air introduced through the inlet I may be heat-exchanged in the heat exchanger H and discharged through the discharge port O. At this time, the air introduced through the suction port I passes through the dust collecting filter 10 before being discharged through the discharge port O, and foreign substances in the air may be filtered.

The air conditioner 100 including the dust collecting filter 10 may include a filter housing (not shown) in which the dust collecting filter 10 is disposed. The filter housing may be installed to be detachable from the air conditioner 100 in a state in which the power of the air conditioner 100 is turned off.

The air conditioner 1 may include a power source 30 that applies a high voltage. The power source 30 may be connected to a control unit (not shown), connected to one electrode of the dust collecting filter 10 to provide power, and connected to the other electrode to provide the ground 40. When the fan operates, the power source 30 for applying a high voltage to the dust collecting filter 10 can be turned on, and the dust collecting filter 10 can collect foreign substances in the air flowing by the fan.

Hereinafter, referring to FIGS. 2 and 3, the dust collecting filter 10 according to an embodiment of the present invention may include a filter medium 12 that collects foreign substances in the air and a plurality of conductive threads 14 disposed on the filter medium. The plurality of conductive threads 14 may include a plurality of first conductive threads 14a to which a high voltage is applied and a plurality of second conductive threads 14b to be grounded.

The filter medium 12 may be formed of a dielectric fiber material forming pores and capable of physically collecting foreign substances. The filter medium 12 may be a fibrous or particulate dielectric filter material including synthetic organic polymers, natural organic polymers, and inorganic materials. For example, the filter medium 12 may be a fibrous nonwoven fabric. When the air flows from upstream to downstream, the air can pass through both sides of the filter medium 12 disposed therebetween.

The plurality of conductive threads 14a and 14b may be spaced apart from each other and sewn to the filter medium 12. For example, the plurality of conductive threads 14a and 14b may be sewn to the filter medium 12 in one direction using a sewing machine such as an industrial sewing machine. At this time, the conductive threads 14a and 14b may be sewn to the filter medium 12 in various patterns or widths by utilizing the function of a sewing machine. By threading a conductive thread serving as an electrode into the filter medium 12, an electric field can be induced with almost no pressure loss.

The plurality of conductive threads 14a and 14b may be long threaded along the first direction DR1, which is the longitudinal direction of the filter medium 12. In this case, the plurality of first conductive threads 14a may be disposed between the plurality of second conductive threads 14b. Also, the plurality of second conductive threads 14b may be disposed between the plurality of first conductive threads 14a. That is, the plurality of first conductive threads 14a and the plurality of second conductive threads 14b may be alternately spaced apart from each other in a second direction DR2 crossing the first direction DR1.

The plurality of first conductive threads 14a and second conductive threads 14b may be disposed parallel to each other. In this case, the plurality of first conductive threads 14a and second conductive threads 14b may be disposed parallel to the first direction DR1.

The plurality of first conductive threads 14a and second conductive threads 14b may be threaded through the filter medium 12 by alternately penetrating one side and the other side of the filter medium 12 in the first direction DR1. At this time, based on any one of the conductive threads 14a and 14b, the filter medium 12 may be threaded in such a way that the threads do not cross or overlap each other. For example, the plurality of conductive threads 14a and 14b may be threaded through the filter medium 12 in a running stitch method through a sewing machine.

The first conductive thread 14a may be connected to the power source 30 to receive a high voltage, and the second conductive thread 14b may be connected to the ground 40 to be grounded. When a high voltage is applied to the first conductive thread 14a, an electric field may be generated between the first conductive thread 14a and the second conductive thread 14b. That is, when a high voltage of +polarity or −polarity is applied to the first conductive thread 14a, an electric force is generated between the first conductive thread 14a the second conductive thread 14b having a zero potential connected to the ground 40, and thus, the fiber particles of the filter medium 12 and the foreign substances in the air passing through the filter medium 12 can be charged (see FIG. 6). This will be described later.

Hereinafter, referring to FIGS. 4 and 5, the filter medium 12 of the dust collecting filter 10 shown in FIG. 2 is bent along a plurality of virtual bending lines b1 and b2 formed along a specific direction, and a corrugated shape can be formed as shown in FIG. 4.

The dust collecting filter 10 bent into a corrugated shape may form a plurality of bent portion C at each of the virtual bending lines b1 and b2. At this time, the filter medium 12 may form the crest of the bent portion C at the first bend line b1 and form the valley of the bend portion C at the second bend line b2. In addition, the filter medium 12 may include a plurality of flat portions F for each of the plurality of bent portions C.

Virtual bending lines b1 and b2 may be formed in a direction crossing the longitudinal direction of the plurality of conductive threads 14a and 14b. For example, the virtual bending lines b1 and b2 may be formed long in the second direction DR2. At this time, the direction in which the plurality of corrugations of the filter medium 12 arranged may be the same as the longitudinal direction of the plurality of conductive threads 14a and 14b, that is, the first direction DR1. The direction in which the plurality of corrugations of the filter medium 12 arranged may be referred as the direction in which corrugations of the filter medium 12 proceed. In other words, the first conductive thread 14a and the second conductive thread 14b may be disposed parallel to the first direction DR1 in which the corrugations of the filter medium proceed. Therefore, even if the two flat portions F facing each other contact each other, the first conductive thread 14a and the second conductive thread 14b do not overlap, thereby preventing the risk of current due to contact between electrodes.

The first conductive thread 14a and the second conductive thread 14b may be alternately disposed on one surface and the other surface of the filter medium 12 along the corrugated shape of the filter medium 12. That is, the plurality of conductive threads 14a and 14b may pass through one surface and the other surface of the flat portion F and the bent portion C alternately and threaded through the filter medium.

The dust collecting filter 10 may be arranged such that a plurality of crests face upstream of air and a plurality of valleys face downstream. In addition, the flat portion F may be disposed long with a slight inclination along the air flow direction A from the bent portion of upstream toward the bent portion of downstream. In this case, the air may flow from the upstream side through the plurality of bent portions C or through the gaps between the plurality of bent portions to the downstream side via the flat portion F.

If corrugations are formed in the filter medium 12, the flat portion F can be disposed long along the air flow direction A, so that the length through which air passes through the conductive threads 14a and 14b and the area through which air passes through the filter medium 12 are increased, so that dust collection efficiency can be improved.

Hereinafter, referring to FIG. 6, when a voltage is applied from the power source 30 to the plurality of first conductive threads 14a, an electric field may be formed between the plurality of first conductive threads 14a and the plurality of second conductive threads 14b that are grounded. At this time, the electric field formed by the plurality of conductive threads 14a and 14b may be activated not only inside the filter medium 12, but also at a gaps between the upstream and downstream sides of the filter medium 12 and the plurality of flat portions F (see FIG. 5).

The electric field may induce a dipole moment in particles of the foreign substances in the air to polarize the foreign substances. At this time, due to the electrostatic force between the polarized foreign substances and the electrically charged conductive thread, the foreign thread may be effectively collected by moving toward the conductive thread on one side.

Also, as described above, the filter medium 12 may be made of a dielectric material. When an electric field is activated inside the filter medium 12 due to the plurality of conductive threads 14a and 14b, the foreign substances and the dielectric fibers of the first filter medium 12 may be electrically polarized due to electrostatic force. At this time, a polarizing force acts between the polarized foreign substances and the fibers of the first filter medium 12, so that the foreign substances can be effectively collected in the first filter medium 12.

Referring to FIG. 7, in the method for manufacturing a dust collecting filter according to an embodiment of the present invention may include a step of threading (S1) the plurality of first conductive yarns 14a and the plurality of second conductive yarns 14b to the filter medium 12 so that they are alternately spaced apart from each other. The first conductive thread 14a and the second conductive thread 14b may be formed of the same conductive thread.

In the step of threading (S1), the first conductive thread 14a and the second conductive thread 14b may be threaded through the filter medium through a sewing machine. It is preferable that the sewing machine is an industrial sewing machine that has relatively strong strength and can firmly and uniformly sew stitches. At this time, the conductive threads 14a and 14b may be sewn to the filter medium 12 in various patterns or widths by utilizing the function of a sewing machine. A dust collecting filter can be manufactured by threading the conductive thread 14 on the filter medium 12 through a sewing machine, so there is little increase in pressure loss and the manufacturing process is very simple.

In the step of threading (S1), a uniform electric field may be induced by threading the first conductive thread 14a and the second conductive thread 14b so as to be disposed parallel to each other. At this time, the first conductive thread 14a and the second conductive thread 14b may be long stitched on the surface of the filter medium 12 in a direction parallel to the first direction DR1.

In the step of threading (S1), the first conductive thread and the second conductive thread may be threaded at the filter medium by alternately passing through one surface and the other surface of the filter medium. At this time, each of the conductive threads 14a and 14b may be threaded through the filter medium 12 in such a way that they do not cross or overlap each other. For example, the plurality of conductive threads 14a and 14b may be threaded through the filter medium 12 in a running stitch method through a sewing machine.

Meanwhile, the method for manufacturing the dust collecting filter may include a step of forming an electrode (S3). In the step of forming the electrodes (S3), the power supply 30 for applying a high voltage may be connected to the plurality of first conductive threads 14a, and the ground 40 may be connected to the plurality of second conductive threads 14b, after the threading step (S1), In the method for manufacturing a dust collecting filter according to an embodiment of the present invention, a conductive thread is threaded through the filter medium 12 and then a power supply is alternately connected, and thus the manufacturing process is simplified and simple, so that massive production is easy.

In the method for manufacturing a dust collecting filter according to an embodiment of the present invention, a conductive material is coated in the length direction of the filter medium, and then a power supply is alternately connected, which has the advantage of simplifying the manufacturing process.

The method for manufacturing a dust collecting filter according to an embodiment of the present invention may further include a step of forming corrugation (S2) after the threading step (S1). The step of forming corrugation (S2) may be performed between the threading step (S1) and the electrode forming step (S3), or may be performed after the electrode forming step (S3).

In the step of forming corrugation (S2), the filter medium 12 may be bent into a corrugated shape to form a plurality of bent portions C arranged in the longitudinal direction (first direction, DR1) of the filter medium. At this time, the filter medium 12 may be bent along a plurality of imaginary bending 2 lines b1 and b2 formed along a specific direction to form a corrugated shape. (see FIGS. 2 and 4)

Meanwhile, the imaginary bending lines b1 and b2 may be formed in a direction crossing the longitudinal direction of the plurality of conductive threads 14a and 14b. For example, the virtual bending lines b1 and b2 may be formed long in the second direction DR2. At this time, in the step of forming corrugation (S2), the filter medium 12 may be bent so that the direction in which the plurality of corrugations of the filter medium 12 arranged is parallel to the longitudinal directions of the first conductive thread 14a and the second conductive thread 14b.

In the above, the preferred embodiment of the present invention has been shown and described, but the present invention is not limited to the specific embodiment described above, various modifications can be made by those skilled in the art without departing from the subject matter of the present invention claimed in the claims, and these modifications should not be understood individually from the technical spirit or perspective of the present invention.

The invention claimed is:

1. A dust collecting filter, comprising:
   a filter medium that collects foreign substances in air;
   a plurality of first conductive threads sewn to the filter medium and to which a high voltage is applied; and
   a plurality of second conductive threads sewn to the filter medium, disposed between the plurality of first conductive threads, and grounded, wherein the filter medium is bent into a corrugated shape, wherein the filter medium includes a plurality of flat portions for each of a plurality of bent portions, and wherein the plurality of first conductive threads and the plurality of second conductive threads pass through a first surface and a second surface of the plurality of flat portions and the plurality of bent portions alternately and are threaded through the filter medium.

2. The dust collecting filter according to claim 1, wherein the plurality of first conductive threads and the plurality of second conductive threads are disposed parallel to each other.

3. The dust collecting filter according to claim 1, wherein the plurality of first conductive threads and the plurality of second conductive threads are alternately disposed on the first surface and the second surface of the filter medium along the corrugated shape of the filter medium.

4. The dust collecting filter according to claim 1, wherein the plurality of first conductive threads and the plurality of second conductive threads are disposed in a direction parallel to a direction in which a plurality of corrugations of the filter medium is arranged.

5. A method for manufacturing a dust collecting filter, the method comprising:
   threading a plurality of first conductive threads and a plurality of second conductive threads to a filter medium so that the plurality of first conductive threads and the plurality of second conductive threads are alternately spaced apart from each other;
   forming a corrugation by bending the filter medium into a corrugated shape; and
   forming an electrode by connecting a power source for applying a high voltage to the plurality of first conductive threads and connecting a ground to the plurality of second conductive threads, wherein the filter medium includes a plurality of flat portions for each of a plurality of bent portions, wherein in the threading, the plurality of first conductive threads and the plurality of second conductive threads pass through a first surface and a second surface of the plurality of flat portions and the plurality of bent portions alternately and are threaded through the filter medium.

6. The method according to claim 5, wherein in the threading, the plurality of first conductive threads and the plurality of second conductive threads are disposed parallel to each other.

7. The method according to claim 5, wherein in the threading, the plurality of first conductive threads and the plurality of second conductive threads are threaded through the filter medium through a sewing machine.

8. The method according to claim 5, wherein, in the forming of the corrugation, the filter medium is bent such that a direction in which a plurality of corrugations of the filter medium arranged is parallel to a longitudinal direction of the plurality of first conductive threads and the plurality of second conductive threads.

\* \* \* \* \*